United States Patent [19]
Bacon et al.

[11] 3,718,039
[45] Feb. 27, 1973

[54] PAIL BAIL EAR TESTER
[75] Inventors: James A. Bacon, Cherry Hill, N.J.; Charles J. Lindenmuth, Levittown, Pa.
[73] Assignee: United States Steel Corporation
[22] Filed: Dec. 2, 1971
[21] Appl. No.: 203,992

[52] U.S. Cl. ...................73/141 AB, 73/88 B, 73/95
[51] Int. Cl. .................................................G01l 5/00
[58] Field of Search ..73/141 AB, 88 B, 139, 95, 130, 73/131

[56] References Cited

UNITED STATES PATENTS

| | | | |
|---|---|---|---|
| 1,848,487 | 3/1932 | Linendoll | 73/131 |
| 1,961,368 | 6/1934 | Larson | 73/141 AB |
| 2,450,188 | 9/1948 | Graaf | 73/141 AB |
| 2,821,080 | 1/1958 | Germignani | 73/88 B |

*Primary Examiner*—Charles A. Ruehl
*Attorney*—Donald S. Ferito

[57] ABSTRACT

Device of the invention functions to apply pulling pressure on the bail ear of a pail to determine if the ear is securely affixed to the pail. The device includes a pressure plat attached to a leg extending at an angle from a lever having a spring-loaded bar with an ear-engaging end projecting therefrom, and indicating means connected with the bar to indicate the amount of pressure exerted on the ear when the end of the bar is engaged with the ear as the pressure plate is pressed against the body of the pail by exerting downward pressure on the end of the lever.

3 Claims, 3 Drawing Figures

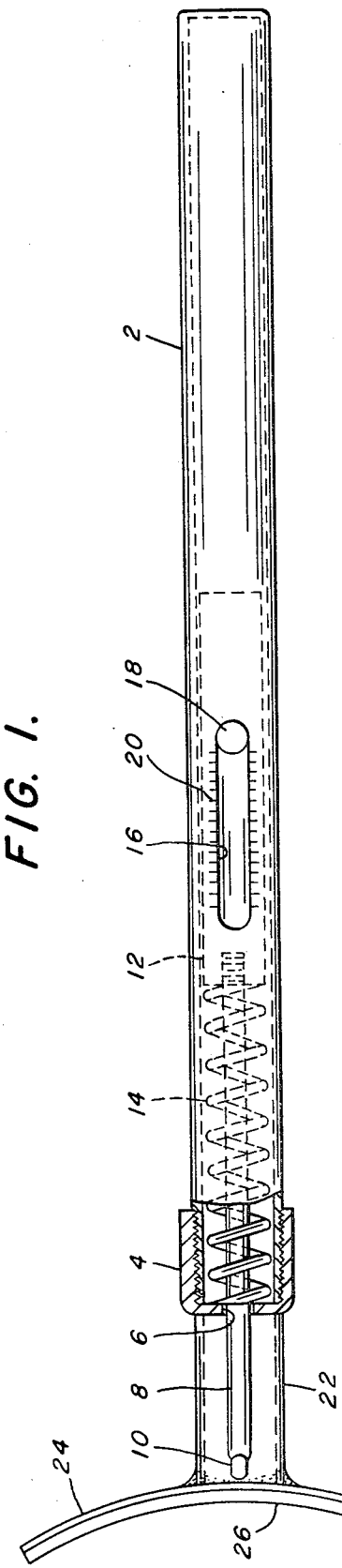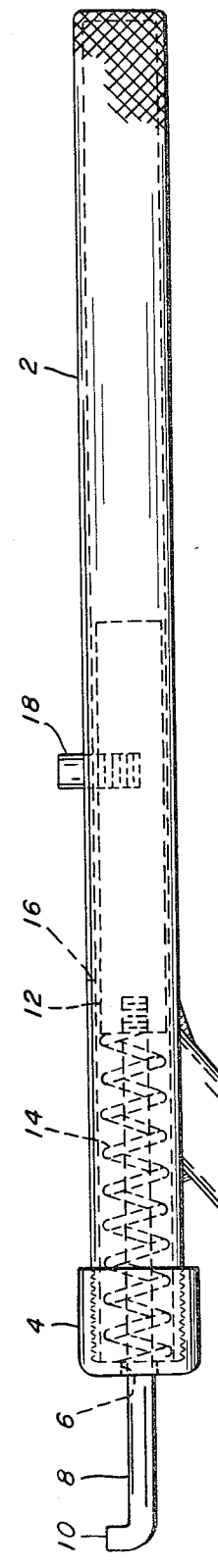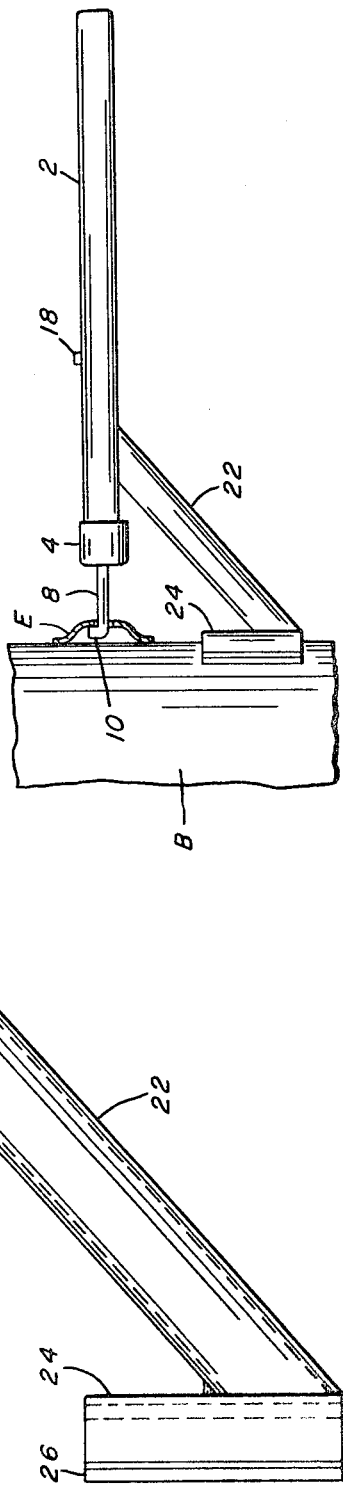
PATENTED FEB 27 1973
3,718,039
FIG. 1.
FIG. 2.
FIG. 3.

PAIL BAIL EAR TESTER

The present invention relates generally to testing apparatus and more particularly to apparatus for testing pail ears to determine if they are securely affixed to the pail body.

In the manufacture of pails having bail ears affixed by welding to the pail bodies, it is essential that the ears be tested to determine whether they are affixed to the pail body securely enough to prevent separation from the pail body when a full pail is lifted by its bail. Prior to our invention such testing was done periodically during production by removing a pail from the production line at intervals and pulling the ears off the pail body with a pair of pliers, channel locks or similar tools. Such testing obviously was crude, inaccurate and time consuming.

It is, accordingly, the primary object of our invention to provide a novel testing apparatus whereby bail ears can be tested non-destructively to determine their resistance to predetermined pressures.

It is a more specific object of our invention to provide an apparatus as set forth by the above statement of object which includes a pressure plate attached to a leg attached to and extending from a lever having a slidable spring-loaded bar therein formed with an ear-engaging end projecting from the lever, and indicating means connected with the bar to indicate the amount of pressure exerted on the ear when the end of the bar is engaged with the ear as the pressure plate is pressed against the body of the pail by exerting downward pressure on the end of the lever.

These and other objects will become more apparent after referring to the following specification and drawing in which:

FIG. 1 is a plan view partly in section of the apparatus of the invention;

FIG. 2 is an elevational view of FIG. 1; and

FIG. 3 is an elevational substantially schematic view showing the device of the invention in operating position.

Referring more particularly to the drawing, reference numeral 2 designates an elongated hollow handle or lever having a cap 4 at one end which is provided with a center aperture 6 for slidably accommodating a bar 8. The bar 8 extends longitudinally in the handle 2 with a portion thereof projecting outwardly of the handle through aperture 6. The outwardly projecting end of the bar 8 is provided with an upturned end 10 adapted to enter the bail hole of a pail bail ear and engage the inner surface of the bail ear. The opposite end of the bar 8 is rigidly connected with an elongated guide plug 12 slidably disposed in the handle 2. Bar 8 is spring-loaded and is constantly urged inwardly of the handle 2 by means of a coil spring 14 which surrounds the bar 8 and bears at one end against the cap 4 and at its other end against the plug 12.

The handle 2 is formed with a longitudinally extending slot 16 intermediate its ends for accommodating a peg 18 which is attached to and projects normal to the plug 12 to project outwardly of the slot 16. When the bar 8 is in resting position, the peg 18 rests against the end of the slot 16 remote from the cap 4. Indicia marking 20 are provided spaced along the slot 16 to indicate pressures exerted by the bar 8 in use. The spring-loaded bar is calibrated to determine what position the peg 18 will be in as the bar exerts various predetermined pressures.

A leg 22 is attached, by welding or similar means, to the handle 2 adjacent its capped end and extends at an acute angle, preferably approximately 45°, to the longitudinal axis of the handle. An arcuate plate 24, which may be lined with a padding 26 of rubber or other resilient cushioning material, is welded or otherwise fixedly attached to the end of the leg 22. The curvature of the plate 24 conforms to the outer contour of the pail body whose bail ears are to be tested. If desired, the end portion of the handle 2 remote from the cap 4 may be knurled to facilitate handling the device during operation.

In operation, the device is used by inserting the upturned end 10 of the bar 8 into the bail hole of a bail ear E to be tested and the plate 24 is rested against the side of the pail body B. A predetermined pressure is then applied downwardly manually on the end of the handle 2 remote from its capped end while the opposite side of the pail is held down manually. When the peg 18 reaches the indicia mark indicating the predetermined pressure the bail ear is required to withstand and the bail ear remains affixed to the pail body, the ear is considered adequately secured to the pail body and passes inspection. If the weld affixing the bail ear to the pail body is faulty, the ear will become detached from the pail body without damage to the pail body before the peg reaches the mark indicating the predetermined pressure.

While we have shown but one embodiment of our invention, other adaptations and modifications may be made without departing from the scope of the following claims.

We claim:

1. Apparatus for testing a pail bail ear having a bail hole therein attached to a pail body to determine if the ear is securely affixed to the pail body which comprises an elongated hollow handle, an elongated leg member attached to said handle adjacent one end thereof and projecting therefrom at an acute angle to the longitudinal axis of said handle, an arcuate pressure plate affixed to the end of said leg, said plate being curved to conform to the outer contour of said pail, said one end of said handle having an aperture therethrough substantially coincidental with the longitudinal axis of said handle, an elongated bar slidably disposed in said handle extending longitudinally thereof with one end of said bar projecting through said aperture, the projecting end of said bar having an upturned end adapted to fit into the bail hole of said bail ear and engage the inner surface of said bail ear, a coil spring surrounding said bar in said handle, an elongated plug affixed to the inner end of said bar slidable in said handle, said spring bearing against said plug at one end and against the surface around said aperture at said one end of said pipe at its other end to constantly urge said bar inwardly of said handle, said handle having a longitudinal slot intermediate its ends and a peg connected with said plug at one end and extending normally therefrom to project slidably through said slot, said peg engaging the end of said slot remote from said one end of said handle when said bar is in retracted position, said peg being adapted to move toward the end of said slot toward said one end of said handle when said upturned end of said bar is in said bail hole of said bail ear engaging the inner surface thereof and said pressure plate is pressed against the outer surface of said pail by the application of downward pressure on the end of said handle remote from said one end.

2. Apparatus as defined by claim 1 in which a lining of resilient cushioning material is provided on the pail-contacting face of said pressure plate.

3. Apparatus as defined by claim 1 including indicia marks on the surface of said handle spaced along said slot to indicate the distance moved by said peg from its position at the end of said slot to thereby indicate the amount of pressure being exerted by the upturned end of said bar on said pail bail ear.

* * * * *